UNITED STATES PATENT OFFICE 2,331,245

METHOD AND COMPOSITION FOR USE IN PRINTING

Hugo Stockmayer, Rutherford, N. J., assignor to General Printing Ink Corporation, New York, N. Y., a corporation of Delaware No Drawing. Application August 3, 1942, Serial No. 453,474

8 Claims. (Cl. 101—149.2)

This invention relates to a method and composition for treating lithographic printing plates, and more particularly to a method and compositions to serve in lithographic plate protecting.

In the lithographic printing process, planographic plates of aluminum, zinc or other suitable material are prepared in such a way that the characters to be printed are ink receptive, while all non-printing portions are treated so as to be ink repellant, the latter being receptive to water.

To prevent loss of moisture receptivity of the non-printing areas and to prevent oxidation of the metal during periods when the plates are idle or in storage, it has been customary to coat the entire plate area with a weakly acidic solution of gum arabic which when dried formed a protective skin or coating over the surface, and which could be washed away with water when the plate was to be reused.

Gum arabic has been universally used in the past and considered the best available colloidal material to use for this purpose, as it is water soluble, and has the desired colloidal skin forming characteristics and produces a solution of the slightly acidic character advantageous in maintaining a continuous slight etching action on the non-printing area, and to prevent emulsification of the printing area. Gum arabic as available on the market fluctuates rather widely in acidity, but due allowance has been made for these fluctuations and it has been used universally, as stated.

It is an object of the present invention to provide a composition for use as a protective coating for idle printing plates and which is satisfactory in its characteristics, is made from readily attainable materials and so may be secured in adequate quantities and at commercially feasible prices and which will be satisfactory for use.

It is a further object of the invention to provide a method and composition for use in protecting idle lithographic printing plates, which are as satisfactory in use as the gum arabic solutions and which are without its disadvantages.

It is a still further object of the invention to provide such a lithographic plate protector which is easily applied from water solution, and which is relatively non-hygroscopic and non-peeling after drying, incompatible with the inks and asphalt solutions used in lithographic printing and yet which is readily resoluble in water.

It is a still further object to provide such a lithographic plate protecting composition containing dextrine and a water soluble cellulose aliphatic ether.

It is a still further object to provide such a lithographic plate protector comprising dextrine and methyl cellulose.

Other objects and advantages of the invention will be apparent from the description and the appended claims.

The combination of qualities necessary for the preparation of such a plate protector to meet operating requirements satisfactorily are almost paradoxical in their character. The material must be readily water soluble, form a relatively strong film when dry which will protect the plate from moisture and slight abrasion during idleness, be incompatible with materials used in lithographic inks and with asphaltum mixture, should dry rapidly, not peel off the metal, be relatively non-hygroscopic when applied, and must be compatible with the acids used in lithography.

These qualities were all present in sufficient measure in the gum arabic solutions previously used. However this material is relatively expensive and under fluctuating world economic conditions, such as those now existing, is often completely unavailable. But nevertheless it has heretofore generally been used because, generally speaking, other materials whose normal uses and characteristics might lead to consideration of them as alternatively usable by the lithographer have been found unsatisfactory and lacking in one or more of the critical requirements enumerated above.

A dextrine solution has certain of the desired properties. However when dextrine is made up in the proper consistency it dries so rapidly that it can not be uniformly applied to the press plate to give the desired uniform covering film by the customary process of "rubbing over" with a cloth wet with the solution. And if made so that it will not dry with such rapidity, so that it can be rubbed over into a covering film, then it does not dry with enough rapidity to prevent disruption of the film before drying nor does it have enough body to provide a sufficient film covering when dried. Furthermore, the dextrine which is applied as a film tends to peel off the metal and thus to destroy the protection which such a film is designed to afford.

I have found, however, that by adding small quantities of a water soluble aliphatic ether of cellulose such as methyl cellulose, to a suitable dextrine solution, not only are the too rapid drying characteristics of the dextrine overcome, but also the tendency to peel is eliminated. More-over, even small amounts, for example between 1 to 5% of methyl cellulose contribute additional properties which insure proper protection of the metal from oxidation and also inhibit the penetration of the asphaltum solution in the "working out" process for the plate. The solution so prepared is compatible with the customary acids used for etching or in the lithographic fountain solutions for example, chromic, phosphoric and nitric acids, although the use of tannic acid should be avoided in connection with the new plate protector solution, as this acid causes precipitation of the solution.

A methyl cellulose of low viscosity, such as one which in a 2% aqueous solution at 20° C., has a viscosity of about 15 centipoises has been found to function satisfactorily in practice and to have the desired characteristics in use specified above. Sufficiently large quantities of this type of methyl cellulose can be put into solution readily to give the desired solutions and characteristics. However, I can use higher viscosity grades of methyl cellulose, even up to those having viscosities up to about 4,000 centipoises, measured as described above. These high viscosity materials are more difficult to put into solution but by blending with suitable quantities of low viscosity methyl celluloses, and with the higher viscosity methyl celluloses in properly selected proportion, solutions can be secured which will be of the desired consistency and flow properties and will produce satisfactory plate protecting films. As stated, the viscosity or consistency of the plate protector solution, whether containing only the low viscosity methyl cellulose or a mixture of two or more of different viscosities, should be thin enough to spread properly over the plate, but not so thin as to run off when the plate is vertically disposed after application of the coating. Likewise the solids content should be high enough so that a continuous protective film will be formed over the plate on drying, and the rate of drying should be slow enough so that the solution can be applied and spread uniformly, but rapid enough so that the plate can be handled almost immediately after the film is applied.

Examples of satisfactory plate protector solutions are given below:

Example I

| | Parts |
|---|---|
| Dextrine | 25 |
| Methyl cellulose (low viscosity (15 cp)) | 7½ |
| Sodium benzoate (preservative) | ½ |
| Water | 175 |

The above solution has a consistency of about 10° Baumé.

In place of the low viscosity methyl cellulose used in Example I, methyl celluloses of higher viscosities may be employed to give the final consistency and working properties required. In such a case, smaller quantities of the higher viscosity materials may be used provided enough material is employed to yield the critical characteristics described. For example in the above illustration I may substitute for the total quantity of 15 centipoise methyl cellulose there specified any one of the following:

2½ parts of methyl cellulose of 400 centipoise viscosity; or 1¾ parts of methyl cellulose of 1500 centipoises; or 1¼ parts of methyl cellulose of 4000 centipoises.

As stated, blends of methyl celluloses of varying viscosities can be made to give the final consistency desired. For example, a satisfactory solution is obtained from the following formula:

Example II

| | Parts |
|---|---|
| Dextrine | 25 |
| Methyl cellulose (blends of different viscosities) | 3½ |
| Sodium benzoate (preservative) | ½ |
| Water | 175 |

The methyl cellulose blends selected for use in Example II may be made up from methyl celluloses of different viscosities to meet the various requirements of use stated above. For example, satisfactory results will be attained using the following combinations of the varying viscosity materials, which in the plate solutions will be found suitable in consistency, solids content, rate of drying and the like.

(a)

| | Centipoises |
|---|---|
| 1.875 parts methyl cellulose | 15 |
| 0.625 parts methyl cellulose | 400 |
| 0.4375 parts methyl cellulose | 1500 |
| 0.3125 parts methyl cellulose | 4000 | or (b)

| | Centipoises |
|---|---|
| 3.75 parts methyl cellulose | 15 |
| 1.25 parts methyl cellulose | 400 |

In preparing my plate protector, I dissolve the dextrine in an equal quantity of water together with the sodium benzoate, or other preservative. The methyl cellulose is dissolved in the remainder of the water, i. e. about twenty times as much water as methyl cellulose, and the two solutions are combined, or both the dextrine and the methyl cellulose can be dissolved simultaneously in the total amount of water, although the practice of first making separate solutions is the more convenient and allows for varying at will the relative concentrations of dextrine and methyl cellulose respectively in the final solution.

The lithographic plates to be protected are placed horizontally on a table, or held vertically or in any convenient manner, and the methyl cellulose-dextrine solution is applied by brushing, or swabbing with a rag or in any desired manner, especial care being taken to see that all the ink receptive printing areas of the plate are well coated. The plate is then allowed to dry, whereupon it may be stacked with other plates for storage until such time as its reuse is desired.

The protective coating serves both to prevent scratching and marring of the delicate printing areas, and also to preserve the ink receptive character of the printing area.

When the plate is to be reused, it is simply washed carefully with water, and is then again ready for use.

While the above sets forth a preferred embodiment of my invention, it is to be understood that departures may be made therefrom within the scope of the invention as described and claimed.

What is claimed is:

1. For use in the treatment of lithographic printing plates bearing a printing image thereon and to provide a film over said plates for protection during periods of non-use, an aqueous solution comprising dextrine, and a smaller portion of methyl cellulose, said mixture having properties of viscosity and film forming substantially equal to those of the usual gum arabic solution.

2. For use in the treatment of lithographic printing plates bearing a printing image thereon an aqueous solution comprising dextrine and a small proportion of a water soluble cellulose ether.

3. For use in the treatment of lithographic printing plates bearing a printing image thereon, an aqueous solution containing a major portion of dextrine and a minor portion of methyl cellulose.

4. For use in the treatment of lithographic printing plates bearing a printing image thereon, an aqueous solution comprising dextrine and methyl cellulose in an amount varying between 1 and 6%.

5. A lithographic plate protector comprising low viscosity methyl cellulose 1 to 6%, dextrine 10–15%, water and a preservative.

6. In the treatment of lithographic printing plates bearing a printing image thereon, applying to the plate an aqueous solution comprising dextrine and a small proportion of a water soluble cellulose aliphatic ether.

7. In the treatment of lithographic printing plates bearing a printing image thereon, applying to the plate an aqueous solution comprising dextrine and methyl cellulose.

8. In the treatment of lithographic printing plates bearing a printing image thereon, applying to the plate an aqueous solution comprising methyl cellulose in amounts varying between 1 and 6%; and dextrine 10–15%.

HUGO STOCKMAYER.